March 31, 1925.     1,531,526
G. THOMAS
WEEDER
Filed May 14, 1924    2 Sheets-Sheet 1
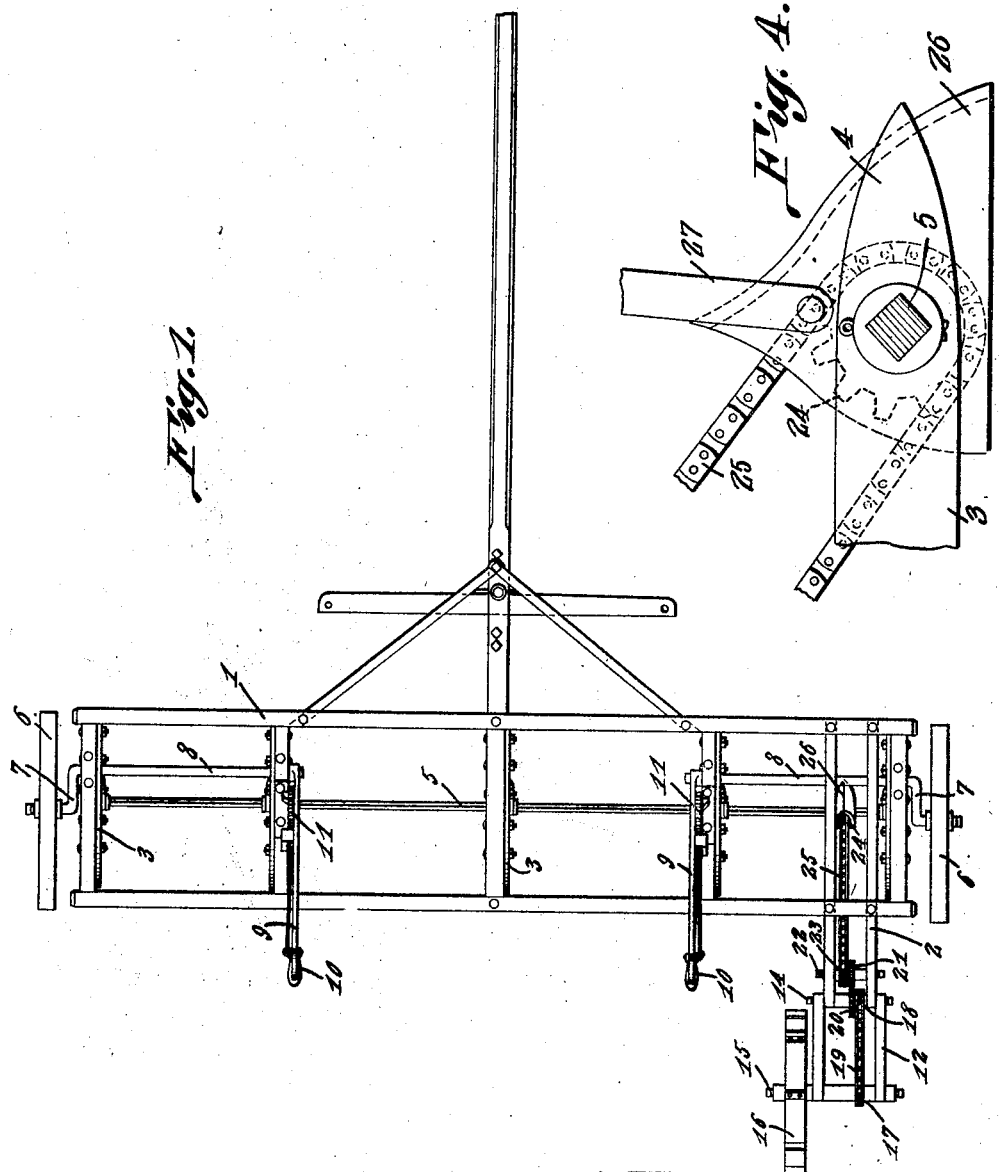

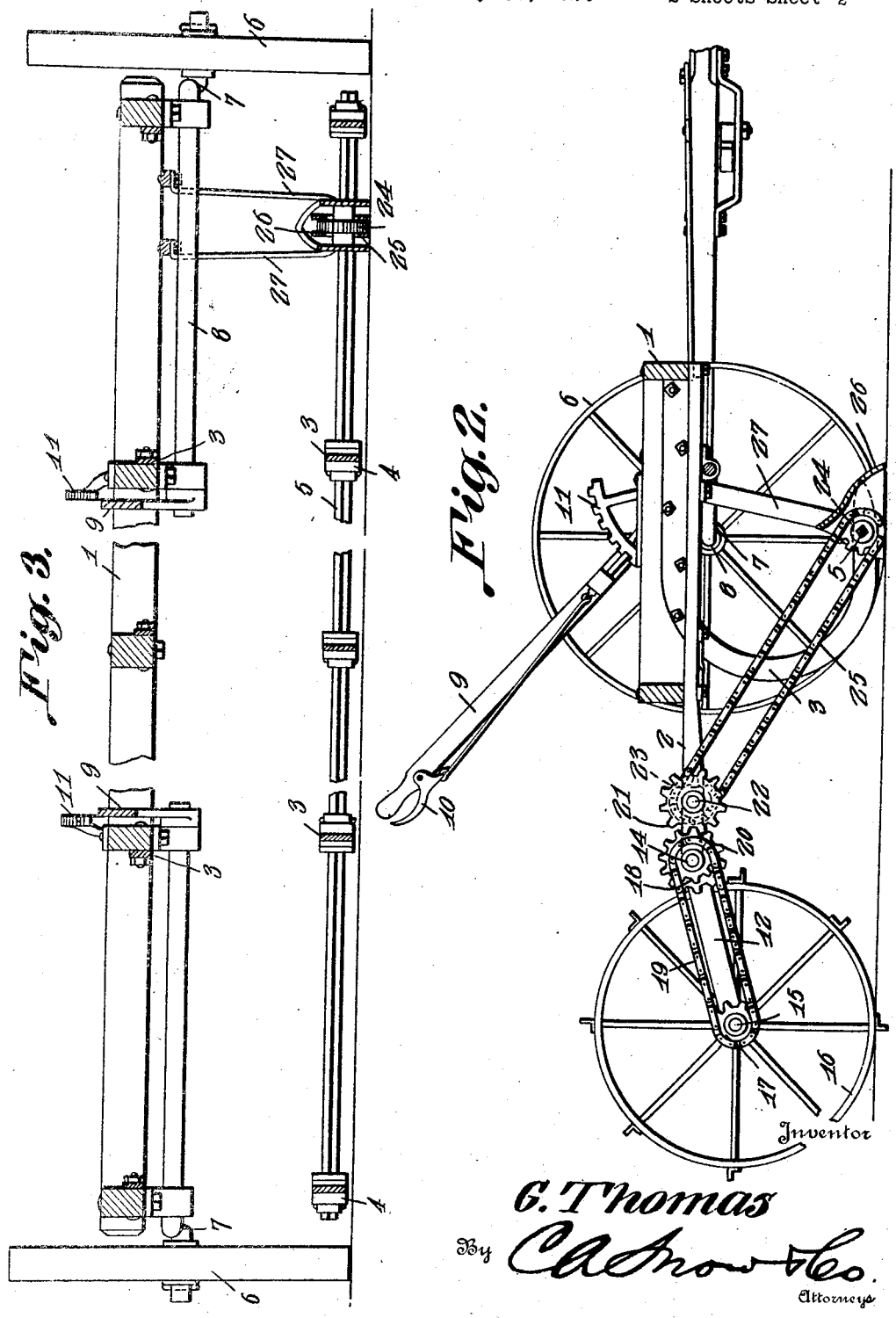

Patented Mar. 31, 1925.

1,531,526

UNITED STATES PATENT OFFICE.

GUSTAV THOMAS, OF LIND, WASHINGTON.

WEEDER.

Application filed May 14, 1924. Serial No. 713,312.

*To all whom it may concern:*

Be it known that I, GUSTAV THOMAS, a citizen of the United States, residing at Lind, in the county of Adams and State of Washington, have invented a new and useful Weeder, of which the following is a specification.

The device forming the subject matter of this application is a weeder of that general sort shown in Patent No. 1,232,149, granted on July 3, 1917, to G. H. Wolfe and shown in my prior Patent No. 1,262,286, issued on April 9, 1918. In weeders of the type mentioned, a rod of polygonal cross section moves beneath the surface of the soil, and is rotated, for the purpose of cutting and macerating weeds.

In a weeder of the kind mentioned, the present application proposes sundry improvements. Generally stated, and broadly considered, these improvements are threefold: First, the provision of novel means for imparting rotation to the polygonal weeding shaft; second, the provision of novel means for rotating the shaft backwardly, meaning by "backwardly" that the shaft rotates in an opposite direction to that in which it would rotate if it were rotated by rolling contact with the surface of the soil as the vehicle moves forwardly, and in a direction opposite to that in which the ground wheel moves, if the vehicle is wheel-mounted, it having been found that a rotation of the shaft in a backward direction, as above defined, renders the machine more efficient than would be the case otherwise; third, the invention aims to provide novel means for raising and lowering the polygonal weeding shaft.

It is within the province of the disclosure to improve generally and to enhance the utility of devices of that type to which the invention appertains.

Although a preferred form of the invention has been shown in the drawings, it will be understood that a mechanic, working within the scope of what is claimed, may make changes, without departing from the spirit of the invention.

In the drawings: Figure 1 shows in top plan, a device constructed in accordance with the invention; Figure 2 is a longitudinal section wherein parts appear in elevation; Figure 3 is a transverse section; and Figure 4 is a fragmental elevation disclosing the shoe, the guard, and attendant parts.

In carrying out the invention, there is provided a frame 1 which may be of approximately rectangular outline, as shown in Figure 1, the frame being provided, adjacent to one end, with a rearwardly prolonged extension 2. Supports 3, preferably in the form of goose-necks, are connected at their upper ends to the frame 1, and are equipped at their lower ends with shoes or moles adapted to penetrate the soil, the shoes being marked by the numeral 4. In the shoes, the polygonal weeding shaft 5, hereinbefore alluded to, is supported for rotation.

In order that the shaft 5 may be raised and lowered with respect to the soil, the ground-wheels 6 of the vehicle are journaled on the cranks 7 of axles 8 mounted to rock on the frame 1, levers 9 being secured to the inner ends of the axles, and being provided with latch mechanisms 10 adapted to cooperate with segments 11 on the frame 1, the construction, obviously, being such that the shoes 4 may be raised and lowered with regard to the ground.

A means is provided whereby the shaft 5 may be rotated, and this means is so constructed that the shaft 5 may be rotated regardless of the extent to which the shoes 4 may have been raised or lowered with regard to the surface of the ground. Having this consideration in mind, an auxiliary frame 12 is mounted to swing vertically on a shaft 14 journaled for rotation in the rear end of the extension 2 of the main frame 1. A shaft 15 is journaled in the rear end of the auxiliary frame 12 and carries a ground-wheel 16. A sprocket wheel 17 is secured to the shaft 15, and there is a sprocket wheel 18 on the shaft 14. About the sprocket wheels 17 and 18, a sprocket chain 19 is trained. The shaft 14 carries a gear wheel 20, meshing with a gear wheel 21 on a shaft 22 journaled in the rear end of the extension 2 of the frame 1, in advance of the shaft 14. The shaft 22 carries a sprocket wheel 23 and there is a sprocket wheel 24 on the polygonal weeding shaft 5. About the sprocket wheels 23 and 24 is engaged a sprocket chain 25. As shown best in Figure 4, the sprocket wheel 24 on the weeding shaft 5 is enclosed within a pointed guard 26, to the end that the sprocket wheel 24 may not be clogged by the soil, the guard 26 being sustained by hangers 27 assembled with the frame 1.

So far as the operation of the machine is concerned, those skilled in the art will note that the shoes 4 may be raised and lowered through the instrumentality of the levers 9, the ground wheel 16 imparting rotation to the shaft 5, the auxiliary frame 12 swinging vertically on the shaft 14, to permit the ground wheel 16 to follow irregularities in the soil and to permit the ground-wheel to exercise its function as a driving means for the shaft 5, regardless of the extent to which the shoes 4 and the shaft 5 have been raised or lowered. The driving train for the shaft 5 embodies the ground-wheel 16, the shaft 15, the sprocket wheel 17, the chain 19, the sprocket wheel 18, the shaft 14, the gear wheel 20, the gear wheel 21, the shaft 22, the sprocket wheel 23, the sprocket chain 25 and the sprocket wheel 24, a reverse rotation being imparted to the weeding shaft 5, the opening portion of this specification being consulted, at this point, for a definition as to what is meant by "reverse" or "backward" rotation of the weeding shaft.

Having thus described the invention, what is claimed is:—

In a device of the class described, a wheel-mounted main frame, a polygonal weeding shaft journaled on the frame, and so located as to pass through the soil, means for raising and lowering the frame and the shaft, an auxiliary frame pivoted to the main frame for vertical swinging movement, a ground wheel journaled on the auxiliary frame, and a driving train connecting the ground wheel with the weeding shaft, the train being so constructed as to drive the shaft whilst the auxiliary frame swings vertically.

In testimony that I claim the foregoing as my own, I have hereto affixed my signature in the presence of two witnesses.

GUSTAV THOMAS.

Witnesses:
 FRANK MORRIS,
 CHAILLIE PHILLIPS.